United States Patent [19]

Holm, deceased et al.

[11] Patent Number: 4,876,100

[45] Date of Patent: Oct. 24, 1989

[54] METHOD FOR PRODUCING MILK WITH A LOWERED BACTERIAL CONTENT

[75] Inventors: Sune Holm, deceased, late of Lund, Ingrid Birgitta Elisabet, Eva Christina Holm, Claes Frederick Holm, executors; Rolf Malmberg, Lund; Kjell Svensson, S. Sandby, all of Sweden

[73] Assignee: Alfa-Laval Food and Dairy Engineering AB, Tumba, Sweden

[21] Appl. No.: 206,126

[22] Filed: Jun. 13, 1988

Related U.S. Application Data

[63] Continuation-in-part of Ser. No. 857,745, Apr. 22, 1986, abandoned.

[30] Foreign Application Priority Data

Sep. 11, 1984 [SE] Sweden .................................. 8404545

[51] Int. Cl.$^4$ .................................................. A23C 1/00
[52] U.S. Cl. .................................... 426/491; 426/522; 426/495; 99/452
[58] Field of Search ............... 426/491, 580, 522, 587, 426/586, 495, 490, 492, 34, 40, 41; 99/452

[56] References Cited

U.S. PATENT DOCUMENTS

| | | | |
|---|---|---|---|
| 3,983,257 | 9/1976 | Malmberg et al. | 426/491 |
| 4,140,806 | 2/1979 | Glimenius et al. | 426/491 |
| 4,515,823 | 5/1985 | Kirschenmann | 426/491 |

FOREIGN PATENT DOCUMENTS 6715081  5/1969  Sweden .

*Primary Examiner*—Marianne Cintins
*Attorney, Agent, or Firm*—Davis Hoxie Faithfull & Hapgood

[57] ABSTRACT

A method for producing milk with a lowered bacterial content is provided. Raw milk is divided by centrifugal separation into one fraction consisting of cream and another fraction consisting of skim milk. The skim milk fraction is directed into a microfilter in which part of the fat globules, protein, and bacteria are separated off. From the microfilter there is obtained a permeate which consists of skim milk having a lowered fat, protein and bacterial content, and a retentate having an increased fat, protein and bacterial content. The retentate is subsequently sterilized.

9 Claims, 3 Drawing Sheets

METHOD FOR PRODUCING MILK WITH A LOWERED BACTERIAL CONTENT

This is a continuation-in-part of copending application Ser. No. 857,745 filed Apr. 22, 1986, now abandoned and International Application PCT/SE85/00325, filed on Sept. 2 1985, and which designated the U.S.

BACKGROUND OF THE INVENTION

The present invention relates to a method and apparatus for producing milk with a lowered bacterial content, in which raw or whole milk is first divided by centrifugal separation into a fraction consisting of cream and a fraction consisting of skim milk. The skim milk fraction is then subjected to special treatment steps directed to the substantial and efficient reduction of its bacterial content.

Conventional means for producing milk with a lowered bacterial content are known. Swedish patent publication No. 208,841 describes a bactofuge treatment of bacteria-containing milk. The milk is first centrifuged in a bactofuge. The resultant liquid milk fraction enriched in bacteria is sterilized by heating, and then remixed with the other fraction of the centrifuged milk. By this treatment about 90% of the bacteria may be removed and destroyed.

Swedish patent publication No. 380,422 discloses dividing whole milk into permeate and retentate (the term "concentrate" is synonymous with the term "retentate") fractions by microfiltration. The permeate, which is the fraction that passes through the pores of the filter (the size of the pores may range broadly from $0.1\mu$—$10\mu$) consists of skim milk ($\mu$=micron). The retentate, which is the fraction retained by the surface of the filter, consists of cream. The fat globules and bacteria in the milk are about the same size, and are substantially retained by the filter. Hence, the skim milk obtained is practically free from bacteria. This method of treating milk is effective but such filtration of whole milk is expensive and power demanding. For example, if a microfilter having pore sizes of $0.1\mu$ were employed according to the teachings of the '422 reference in order to separate whole milk, the filter pores would become blocked by fat, protein and bacteria very rapidly.

Swedish published patent application No. SE A 67 15081 contains a single claim, which discloses a method for sterilizing milk. According to this claim, the fat is first separated from the skim milk. Next, the fat fraction is sterilized by means of heat, and the skim milk fraction is sterilized by means of bacteria filtering (no filter pore sizes are given). Finally, the sterilized fat and skim milk fractions are remixed to yield a sterile milk product. In order to so sterilize the skim milk fraction by means of bacteria filtering, the pore size in the filter must be so small that no bacteria can pass through it. As can be seen in the *Ultrafiltration Handbook*, M. Cheryan, p.5 (Technomic Pub. Co., Penna., 1986), the size of the smallest bacteria is less than about $0.5\mu$. Hence, the pores in a filter suitable to achieve the object of the Swedish '081 reference must be even smaller.

Notwithstanding the advantages that would be attained by separately sterilizing fat and skim milk fractions in this manner, the processing costs of such bacteria filtering are very high. Many of the bacteria, fat globules and proteins which are present in the skim milk prior to such filtering are all about the same size. Hence, the pores of a bacteria filter which is effective to so sterilize skim milk will hold back not only the bacteria, but also the fat globules and at least some of the proteins. Such a filter quickly becomes blocked by trapped material. Hence, the flow rate through the filter rapidly declines and the filter must be frequently cleaned or replaced. The high cost of such an inefficient process may be prohibitive.

In some instances it is of particular importance to obtain milk with a lowered bacterial content. For example, a particular batch of raw milk may be so contaminated that mere pasteurization will not result in adequate storage life. For some applications, moreover, it may be of value to be able to provide treated milk in which the bacteria content has been reduced e.g., to about one hundredth of the original value. It is especially important to provide milk with a relatively low bacterial content for the production of cheese, since incorrect bacteria cultures can destroy the cheese. It is normally not suitable to simply heat-treat milk to a sufficient degree for use in cheese production, because such heat treatment may give a lower yield of cheese and can also adversely influence the coagulation time. Conventionally, one usually adds saltpeter in order to avoid incorrect cheese fermentations. Other additions include lysozyme and hydrogen peroxide. In many instances, however, it would be desirable to avoid the addition of saltpeter or other additives.

From the above discussion, it is clear that there is a continuing need for improved milk processing technology which can provide a more nearly sterile product at lower cost.

SUMMARY OF THE INVENTION

This invention provides an improved method and apparatus for producing milk with a lowered bacterial content. According to the method, the milk to be treated (hereinafter "raw milk") is first centrifugally separated into cream and skim milk fractions in a conventional manner. The skim milk fraction is then separated, by a microfilter, into a retentate and a permeate. The pores in the microfilter are sized so as to retain most, but not all, of the bacteria. Hence, the resultant permeate contains some bacteria and some of the fat and proteins. The retentate, which contains most of the bacteria and remaining fat, and at least some of the proteins, is then sterilized. The permeate fraction may constitute end product without further treatment, even though it does contain some bacteria.

It is a primary object of this invention to obtain considerable reduction of the bacterial content of raw milk, without the large costs involved in direct filtration of such raw milk. According t this invention, only the skim milk fraction of the milk is passed through a microfilter. Only that portion of the skim milk fraction which is retained by the retaining membrane surface of the microfilter (the retentate fraction), must be subjected to subsequent sterilization. Since the microfilter pores are sized so as to retain most but not all of the bacteria, fat, and proteins which are present in the skim milk, the flow rate through the microfilter is greatly increased relative to a sterilizing bacteria filter, and clogging of the filter occurs much less frequently. Although the permeate contains some of the bacteria, sterilization is unnecessary, because the initial growth rate of the small remaining concentration of bacteria is low enough to still result in greatly increased storage life of the resultant milk product.

The storage life of milk produced according to the method of this invention is substantially increased over that for conventionally-pasteurized milk. No only is the total bacteria content of the processed milk substantially reduced, but the concentration of Bacillus cereus bacteria in particular is greatly reduced. *Bacillus cereus* are often the predominant bacteria in conventionally-processed milk of relatively advanced age, because they can survive pasteurization and thrive at cold temperatures Milk processed according to the invention can, if desired, be used to produce cheeses without the use of any additives. For example, the low bacteria content of the milk reduces the occurrence of butyric acid fermentation. Such fermentation may adversely affect taste quality of the product, and can lead to cracks due to gas formation. Moreover, higher cheese storage temperatures, resulting in more rapid cheese maturation, can often be used without excessive undesired fermentations.

DESCRIPTION OF THE PREFERRED EMBODIMENTS

More particularly, according to a preferred embodiment of the invention, the raw milk to be processed is first directed through a heat exchanger to adjust it to a suitable temperature, and is then passed through a centrifugal separator, yielding a cream fraction and a skim milk fraction. Optionally, the centrifugal separation also yields a sludge fraction containing some of the bacteria, which can be discarded or sterilized for remixing a desired. The skim milk fraction is further passed through a microfilter which is equipped with a retaining membrane surface, yielding a permeate fraction and a retentate fraction. The permeate, which is the portion of the skim milk fraction that passes through the retaining membrane surface of the microfilter, consists of skim milk with a lowered fat globular, protein and bacterial content (relative to the skim milk fraction before microfiltration). The permeate fraction does not require sterilization. The retentate friction, which is the portion of the skim milk fraction that is retained by and recovered from the retaining membrane surface of the microfilter, consists of skim milk with an increased fat globular, protein and bacterial content (relative to the skim milk fraction prior to microfiltration). The retentate fraction is subsequently passed through sterilization means. Optionally, the cream fraction or a portion thereof may be combined with the retentate prior to such sterilization. Finally, the permeate, retentate and cream fractions are recovered. Optionally, two or all three of these fractions can be remixed in desired proportion.

The pore size in the microfilter membrane must be slightly larger than the smallest bacteria present in the raw milk to be treated, so that not all of the bacteria, fat, and proteins are retained by the microfilter. (The smallest bacteria are generally about $0.3\mu$ to about $0.4\mu$ in diameter). This provision ensures that the flow rate through the microfilter will be adequate. However, the pores should be no larger than necessary to maintain an adequate flow rate, in order to minimize the concentration of bacteria in the resultant permeate. At a minimum for effective operation to obtain practical results, the pores in the microfilter membrane must have an average diameter of at least about $0.8\mu$. Conversely, pore sizes in excess of about $2.0\mu$ diameter will result in excessive passage of bacteria and should therefore be avoided. Preferably, the pores have an average diameter of about $1.4\mu$. Most preferably, ceramic membrane filters having average pore sizes of about $1.4\mu$ diameter are employed. Such microporous filters are well known and readily available. Particularly useful are alpha-alumina membrane filters available commercially from Societe des Ceramiques Techniques, a French Company.

Microfilter pore sizes can be measured by conventional techniques. According to one typical, well known procedure, the filter is immersed in alcohol and the air pressure required to press a first air bubble through the membrane is measured. Standard tables are available which correlate this air pressure with membrane pore size. Different methods for determining pore sizes, however, may yield slightly different results. In particular cases, filter pore size may have to be adjusted in response to actual filter blockage rates and permeate bacteria concentrations obtained.

The microfilter is preferably arranged in a first circulation path comprising a first pump, in order to obtain a sufficient flow of skim milk passing through the membrane surfaces in the microfilter. Optionally, part of the cream fraction, normally a small percentage, can be remixed with the skim milk prior to microfiltration. However, the capacity of the microfilter diminishes rapidly with an increasing fat content in the milk to be filtered.

In addition to this first circulation path, a second circulation path comprising a second pump is preferably also provided, in order to allow recirculation of permeate from the microfilter to the first circulation path upstream of the microfilter. By recirculating smaller or larger amounts of permeate which then passes through the microfilter again, it is possible to compensate for the variations in flow resistance which exist between startup and steady state for the flow through the microfilter.

The skim milk must be directed to flow in a cross flow filtration path to avoid excessive buildup of debris on the retaining membrane surfaces. The milk circulates at a high rate in a flow generally parallel to the membrane surface, and a portion of the circulating milk is continuously removed as retentate in order to avoid excessive concentrations of bacteria, fat and protein. Those skilled in the art will recognize suitable filter systems for use. For example, the membranes may be flat surfaces arranged in parallel, or filter tubes within shells. Generally, in order to obtain a sufficient flow volume through the membrane of the microfilter, the skim milk must pass through the surface of the membrane at a high speed.

The capacity of a typical pasteurization plant is constant, while the capacity of the microfilter is very large when the microfilter is clean at the start of an operating period but falls rapidly thereafter. When the capacity of the microfilter falls below that of the pasteurization plant, the latter plant may have to be stopped. The recirculation of permeate described above makes it possible to interface a microfilter having a variable capacity, with a pasteurization plant intended for continuous treatment of a pre-determined amount of milk, e.g., that which is equivalent to the capacity of the centrifugal separator.

The skim milk fraction is preferably heated or cooled, after centrifugal separation and prior to entering the first circulation path, to a suitable temperature for microfiltration. Such temperature adjustment should take into account process heat, e.g., that which results from the work of the first pump during operation.

In a preferred embodiment, a heat exchanger is provided between the centrifugal separator and the first circulation path in order to ensure a suitable temperature of the skim milk for microfiltration. Additional heat exchangers can be provided (see e.g., the discussion of FIG. 2 below). Conventional plate or tube-type heat exchangers, for example, can be used.

Studies of microfilter clogging have shown that the highest flow rate but also the most rapid filter clogging is obtained when microfiltration takes place at a relatively high temperature, e.g., about 60° C. Hence, it is advantageous to start the filtration with the circulating milk at a temperature of about 40° C. at the beginning of each operating period (e.g., after the microfilter has been cleaned) and then allow the temperature to slowly rise to about 60° C. The method may be carried out as an intermittent succession of operating periods, to allow for cleaning of the microfilter. Alternatively, the method may be adapted to continuous operation.

After microfiltration, the retentate is subjected to sterilization. Preferably, the sterilization is carried out by heating the retentate to a suitable temperature. Since cream from the centrifugal separator normally contains about the same bacteria content as the skim milk fraction, it may be desirable in some cases to sterilize it as well. However, such sterilization is optional.

Optionally, two or more fractions selected from retentate, permeate and cream are then combined. They can then be homogenized and/or pasteurized, if desired. Cream, skim milk and standardized or whole milk products are all normally pasteurized prior to beverage end use.

Optionally, the microfilter and sterilization unit may be disconnected so that ordinary pasteurization can be carried out. Alternatively, for example, the pasteurization plant can be similarly disconnected. With such an arrangement it is possible to adapt the operation easily to occasional changes in production, as for example a malfunction of the microfilter or sterilization unit or in the pasteurization equipment.

Preferably, separate cleaning circuits with temperature controls and cleaning programs are provided for the microfilter and sterilization units. The microfilters normally must be cleaned after about 5–8 hours of operation. There are special cleaning problems in both the microfilter and sterilization units. In the microfilter it may be difficult to remove the coating or milk proteins which spontaneously is formed on the surface of the membrane when milk passes through the membrane. In the sterilization unit, the high temperatures employed may lead to incrustations. Cleaning of the microfilter suitably takes place by first rinsing the surfaces of the membrane, and then flushing a strongly alkaline detergent over the surface of the membrane. The membrane should be exposed to the detergent for several hours, and thereafter it is rinsed away with water. A good cleaning of the surfaces of the membrane is obtained by such a treatment even from substances which dissolve with difficulty. A chemical influence on the membrane also occurs which improves subsequent filtration. This cleaning also has a good bacteriostatic effect.

The method of this invention may be used to advantage where the desired end product is either whole milk, standardized milk, or skim milk. Cream is normally a by-product in any case. If, for example, the permeate is mixed with the sterilized retentate, or a part thereof, the end product consists of skim milk. If, in another case, the whole or part of the cream fraction is mixed with the skim milk, then whole milk or standardized milk is obtained.

The invention is illustrated further below with reference to FIG. 1.

Raw milk 1 from cooled storage tanks in a dairy is heated to a suitable separation temperature in a plate heat exchanger 2 and is thereafter directed into a centrifugal separator 3, where it is divided into two fractions. One fraction 4 consists of cream which is further divided into two part streams 5 and 6. The part stream 5 is directed away, pasteurized, and recovered as end product. From the centrifugal separator there is also obtained skim milk fraction 7. The skim milk fraction is directed into a heat exchanger 8 in order to be cooled or heated to a suitable temperature, and then directed into a first circulation path 9 comprising a pump 10 and a microfilter 11. The microfilter may consist of a number of membranes arranged in parallel to each other, over which the skim milk is directed in parallel with the surfaces of the membranes. The membranes are made of a filter material which is properly authorized for use in food processing.

The circuit 12 together with a second pump 13 constitutes a second circulation path which makes it possible to recirculate permeate to the skim milk fraction upstream of the microfilter. From the microfilter 11 a permeate flow consisting of skim milk with a lowered bacterial, protein and fat content is taken away by way of a pipe 12. Permeate is then directed through the heat exchanger 2 to adjust its temperature. The retentate 14 obtained by the microfiltration, which contains fat globules, protein and bacteria, is combined with the part stream 6 of cream and directed into a sterilization plant 15. The combined sterilized retentate and cream 16 are then mixed with the heated permeate, yielding milk of a predetermined fat content. This mixture is then directed into the heat exchanger 2 in order to be subjected to a finishing heat treatment step. This may be, depending on the intended use for the milk product, either pasteurization (for beverage use) or, if the milk is to be used for the production of cheese, a milder heat treatment.

If desired, the skim milk fraction outflow from the centrifugal separator may bypass the microfilter and sterilization unit and be directed immediately to the heat exchanger 2 by way of pipe 17. The cream fraction 6 may, if desired, bypass the sterilization unit 15 through pipe 18. Being able to disconnect the microfilter, sterilization unit or pasteurization plant from the operation may be of advantage, e.g., if the microfilter or sterilization unit malfunctions or if an unexpected demand arises for milk which only needs pasteurizing. If homogenization of the milk is desired, this suitably takes place immediately prior to the pasteurization.

Figure 1:
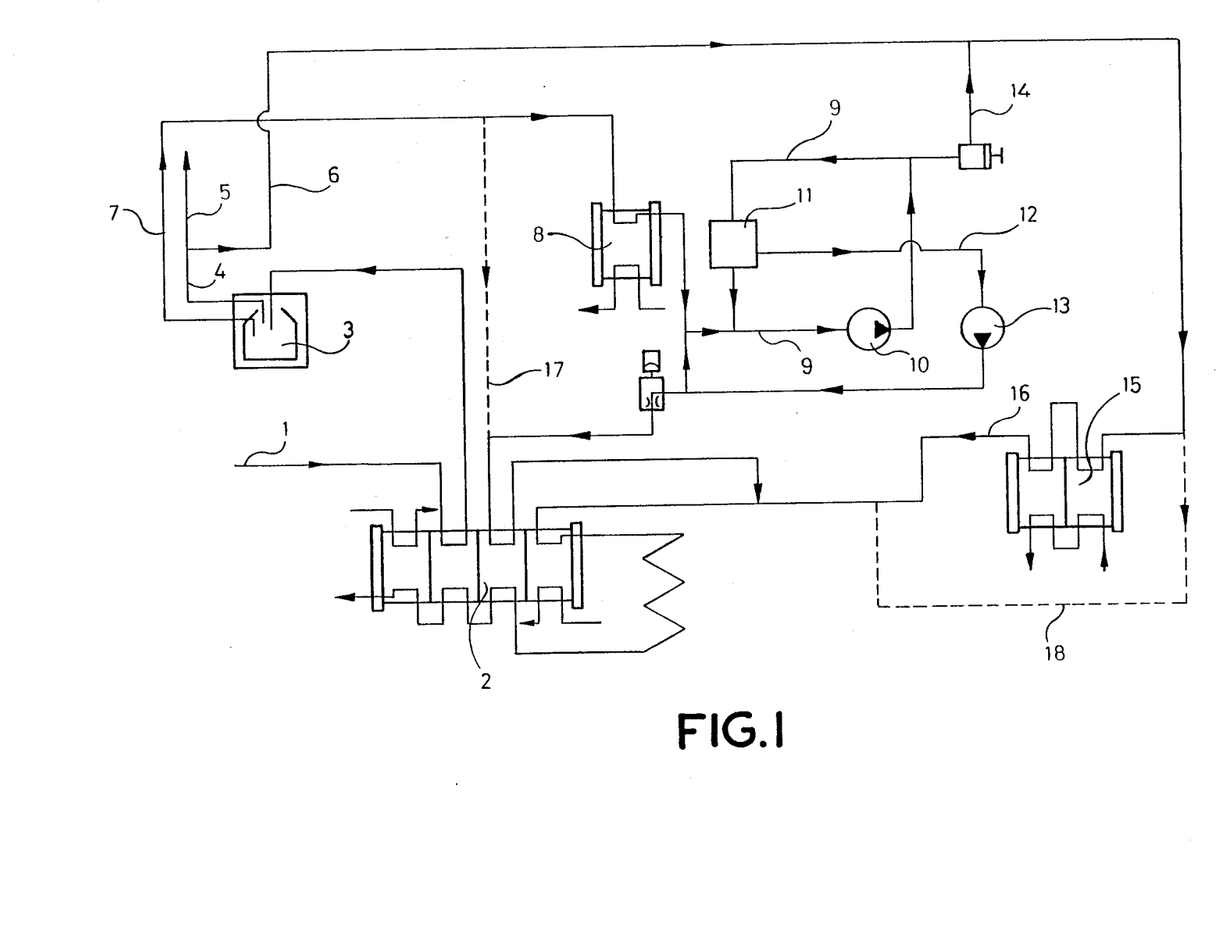
FIG. 1 is a schematic flow chart of an embodiment of the method of the invention.

Suitable apparatus for carrying out the method of the invention can be constructed by interconnecting conventional equipment including centrifugal separators, microfilters, sterilization units, heat exchangers and pumps in accordance with the flow patterns shown in FIG. 1 and described above. Those skilled in the art will readily be able, using FIG. 1 and the above discussion, to provide valves for flow and pressure control and other necessary support equipment to make such apparatus operable, and to then make further conventional modifications to such apparatus as needed in particular cases.

The examples below further illustrate particular embodiments, but in no way are intended to limit the scope of the invention, which is defined in the claims.

EXAMPLE 1: PRODUCTION OF STANDARDIZED MILK

Referring again to FIG. 1, a continuous feedstock of 10,000 liters per hour (l/h) whole milk with 4% fat content was heated to a separation temperature of 52° C. and directed into a centrifugal separator from which was recovered 1,000 l/h cream with a fat content of 40%. Of these 1,000 l/h of cream, 250 l/h was taken away, pasteurized, and constituted end product, while 750 l/h was used for remixing as described below. From the centrifugal separator there was also obtained 9,000 l/h skim milk with a fat content of 0.06%. In the second circulation path a flow was maintained by the pump 13 which varied from 8,000 l/h to 16,000 l/h. From the second circulation path there was taken 8,100 l/h permeate with a fat content of 0.04%, while from the first circulation path 900 l/h retentate with a fat content of 0.25% was taken away. The average pore size in the ceramic microfilter employed was about 1.4μ. The retentate was mixed with the 750 l/h of cream, to yield 1,650 l/h cream mixture having a fat content of 18%, which was then sterilized. After sterilization, the cream mixture was combined with the 9,000 l/h skim milk. The end product constituted 9,750 l/h standardized milk with a fat content of 3%.

EXAMPLE 2

Another processing operation was carried out as described in detail below, and tests were done by the Swedish Dairies Association on the resultant products.

Figure 2:
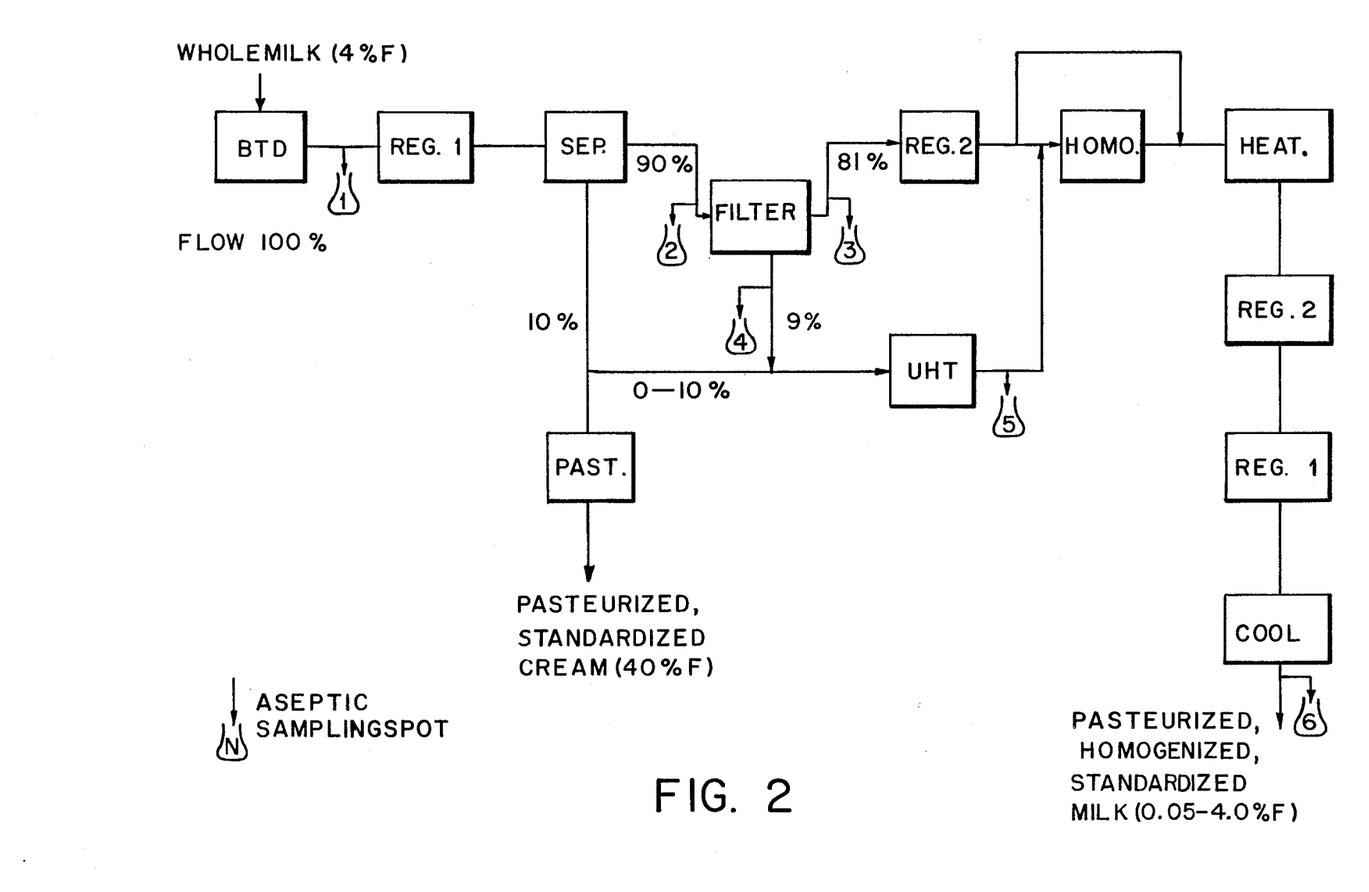
FIG. 2 is a schematic flow chart of another embodiment of the method of the invention.

Referring to FIG. 2, whole milk (4% fat, 100,000 bacteria/milliliter [ml]) was directed into a conventional balance tank (BTD), the purpose of which was to maintain a steady flow of the whole milk to the rest of the system. From the balance tank the milk was directed into a regenerative heat exchanger (REG. 1) and preheated to a temperature of 50° C.

The purpose of the two regenerative heat exchangers (REG. 1 and REG. 2) was to utilize downstream heat from processed milk fractions to raise the temperature of upstream milk fractions as desired. In FIG. 2, the two instances of "REG. 1" represent the passage of the two indicated milk flows through opposite sides of the same heat exchanger. The same is true for the two instances of "REG. 2" in the Figure.

In the case of REG. 1, the downstream, higher temperature flow was the outflow of standardized milk after it had been both pasteurized and passed through a first heat exchanger (REG. 2). After passing through REG. 1, the heated upstream whole milk was then transported to a centrifugal separator (SEP). The milk was then divided into skim milk (0.06% fat, 80,000 bacteria/milliliter, and constituting about 90% of the flow of whole milk) and cream (40% fat, constituting about 10% of the flow of whole milk), in the centrifugal separator. The skim milk was then directed into a ceramic microfilter (FILTER) having an average pore size of about 1.4μ, and separated into two fractions. One fraction, the permeate, which was the portion of the skim milk which passed through the membranes in the filter, contained 0.06% fat, 80 bacteria/milliliter, and constituted about 81% of the flow of whole milk. The other fraction, the retentate, which was the portion of the skim milk which did not pass through the filter, contained 0.2% fat, 250,000 bacteria/milliliter, and constituted about 9% of the flow of whole milk. The retentate was then mixed with sufficient cream (about 2%) calculated to yield the desired final milk product fat content (0.5% fat). The mixture of cream and retentate was then heat treated (UHT) at 130° C. at which practically all bacteria were destroyed. The sterilized mixture of cream and retentate (3.5% fat and containing less than 1 bacteria/milliliter) was then directed into a homogenizer (HOMOG), where it was mixed with permeate after the latter passed through regenerative heat exchanger 2 (REG. 2). The mixture of retentate, cream and permeate was then homogenized at a temperature of about 65° C. and finally pasteurized by heating (HEAT) to 77° C. for 15 seconds. The milk was then cooled to about 4° C. (COOL). The recovered final milk product (0.5% fat and 8 bacteria/milliliter) was then directed into storage tanks and packing equipment as desired. The remainder of the cream fraction (not combined with the retentate) was separately pasteurized (PAST).

The microfilter system was then disconnected so that the operation was set to perform conventional pasteurization. Whole milk was then treated by this system. The resultant control milk was used as a comparative reference in testing reported below.

BACTERIOLOGICAL SHELF-LIFE TESTING

Milk was processed according to the method of the invention as in Example 2 above. The resultant standardized milk was then analyzed for bacteriological shelf life, as detailed below. Results are reported from representative trial days (1-4). Control milk from the same trial days which was only subjected to conventional pasteurization was used as a reference for comparison.

Table 1 shows the condition of raw milk, skim milk, retentate and permeate from Example 2, the latter three products having been produced according to the invention, for each of trial days 1-3 after an initial 24 hours of storage. Such data for trial day 4 were not recorded.

By the method of the invention as practiced to yield these test products, 99.8% of the bacteria were removed from the skim milk by the microfilter.

TABLE 1

| Trial Day | Total Number of Bacteria Per ml | | | | Bacterial effect of the process |
|---|---|---|---|---|---|
| | Raw Milk | Skim Milk | Retentate | Permeate | % reduction of bacteria |
| 1 | 36,300 | 65,000 | 180,400 | 115 | 99.8 |
| 2 | 40,900 | 91,300 | 163,400 | 153 | 99.8 |
| 3 | 239,500 | 48,200 | 220,400 | 86 | 99.8 |

Shelf-life testing of (1) milk processed according to the invention as detailed in Example 2, and (2), control milk from the same trial day which was only conventionally pasteurized, was begun after 6-7 days of storage (storage temperature was 8° C.). The samples were then tested roughly every other day. When particular samples had deteriorated beyond acceptability, testing on them was terminated; and all testing ended after 21 days. Taste and smell of the milk samples was point rated from 5 (best) to 1 (rancid, acid, and/or bitter), and 3 was considered the limit for acceptability.

bacteria, and taste/smell. Blank spaces simply indicate that data were not recorded. Table 5 sets forth similar data for trial day 4.

TABLE 2

| Days Of Storage | Milk Processed According to Example 2 (Trial Day 1) Number of Bacteria Per ml | | | | Conventionally-Pasteurized Milk Number of Bacteria Per ml | | | |
|---|---|---|---|---|---|---|---|---|
| | *Coli | Total Number | B. cereus | Taste & Smell | Coli | Total Number** | B. cereus | Taste & Smell |
| 1 | <1 | 4 | | | <1 | 300 | | |
| 6 | <1 | 10 | <10 | | <1 | 320 | <10 | |
| 8 | <1 | <10 | <10 | | <1 | 780 | 590 | |
| 10 | <1 | <10 | <10 | | <1 | 49,000 | 36,000 | |
| 12 | <1 | <10 | <10 | | <1 | 1.4 mil. | 1.8 mil. | |
| 14 | <1 | <10 | <10 | | | | | |
| 16 | <1 | 400 | <10 | | | | | |

*< = "less than"
**mil. = "million"; total bacteria counts were determined according to International Dairy Federation rules and procedures. The various types of bacteria were cultured on a particular substrate, and the number of resulting bacteria colonies were then counted.
***B. cereus bacteria counts were determined according to International Dairy Federation rules by culture on a substrate known to be especially suitable for B. cereus growth. Hence, where the B. cereus count for a sample is higher than total bacteria count, this is a result of the different test procedures employed.

TABLE 3

| Days Of Storage | Milk Processed According to Example 2 (Trial Day 2) Number of Bacteria Per ml | | | | Conventionally-Pasteurized Milk Number of Bacteria Per ml | | | |
|---|---|---|---|---|---|---|---|---|
| | Coli | Total Number | B. cereus | Taste & Smell | Coli | Total Number | B. cereus | Taste & Smell |
| 1 | <1 | <10 | <10 | | <1 | 90 | | |
| 7 | <1 | <10 | <10 | 4 | <1 | 1,800 | 110 | 4 |
| 9 | <1 | <10 | <10 | 4 | <1 | 20,000 | 6,600 | 4 |
| 11 | <1 | <10 | <10 | 4 | <1 | 410,000 | 710,000 | 4 |
| 13 | <1 | <10 | <10 | 4 | | | | |
| 15 | <1 | <10 | <10 | 4 | | | | |
| 17 | <1 | <10 | <10 | 4 | | | | |
| 19 | <1 | 260 | <10 | 4 | | | | |
| 21 | <1 | 800 | <10 | 3 | | | | |

TABLE 4

| Days Of Storage | Milk Processed According to Example 2 (Trial Day 3) Number of Bacteria Per ml | | | | Conventionally-Pasteurized Milk Number of Bacteria Per ml | | | |
|---|---|---|---|---|---|---|---|---|
| | Coli | Total Number | B. cereus | Taste & Smell | Coli | Total Number | B. cereus | Taste & Smell |
| 1 | <1 | <10 | | | <1 | 1,400 | | |
| 6 | <1 | <10 | <10 | 4 | <1 | 1,500 | 110 | 4 |
| 8 | <1 | <10 | <10 | 4 | <1 | 13,000 | 8,100 | 4 |
| 10 | <1 | 10 | <10 | 4 | <1 | 270,000 | 560,000 | 4 |
| 12 | <1 | 480 | <10 | 4 | | | | |
| 14 | <1 | 9,900 | <10 | 4 | | | | |
| 16 | <1 | 11,500 | <10 | 3 | | | | |
| 19 | <1 | 12 mil. | <10 | 2 | | | | |
| 21 | <1 | 29 mil. | <10 | | | | | |

Tables 2-4 set forth the test results for trial days 1-3, respectively. Each table lists: number of E. coli bacteria, total number of bacteria, number of Bacillus cereus

TABLE 5

| Days Of Storage | Milk Processed According to Example 2 (Trial Day 4) Number of Bacteria Per ml | | | | Conventionally-Pasteurized Milk Number of Bacteria Per ml | | | |
|---|---|---|---|---|---|---|---|---|
| | Coli | Total Number | B. cereus | Taste & Smell | Coli | Total Number | B. cereus | Taste & Smell |
| 1 | <1 | <10 | | | <1 | 860 | | |
| 6 | <1 | <10 | <10 | 4 | <1 | 3,700 | 130 | 4 |
| 8 | <1 | <10 | <10 | 4 | <1 | 1.7 mil. | 12,000 | 4 |
| 10 | <1 | <10 | <10 | 4 | | | | 3 |
| 12 | <1 | 280 | <10 | 4 | | | | 1 |
| 14 | <1 | 4,300 | <10 | 4 | | | | |
| 16 | <1 | 61,000 | <10 | 3 | | | | |
| 19 | <1 | 1.7 mil. | <10 | 2 | | | | |
| 21 | <1 | 13 mil. | <10 | 1 | | | | |

The results in Tables 2–5 clearly show the dramatic improvement in milk storage stability which results from the process of the invention. In Table 2, by day twelve, conventionally-pasteurized milk was spoiled, whereas milk processed according to Example 2 was still acceptable after sixteen days. In Table 3, the milk processed according to the invention as in Example 2 was in good condition through nineteen days of storage, and only developed a flavor by the twenty-first day. Conventionally-pasteurized milk developed a flavor a full week sooner. In Table 4, milk processed in a conventional manner was approaching unacceptability by day 10 (compare total bacteria count and B. cereus bacteria count with the other Tables), whereas milk produced as in Example 2 according to the invention was still acceptable after 16 days. In Table 5, the conventional milk was only acceptable up to the tenth day, whereas milk processed according to the invention as in Example 2 was still usable by the sixteenth day. The bacteria content of the milk processed according to the invention as in Example 2, moreover, remained very low through the first ten to twelve days of storage for all four days. Additionally, no increased populations of B. cereus bacteria were detected in any of these tests.

EXAMPLE 3

Figure 3:
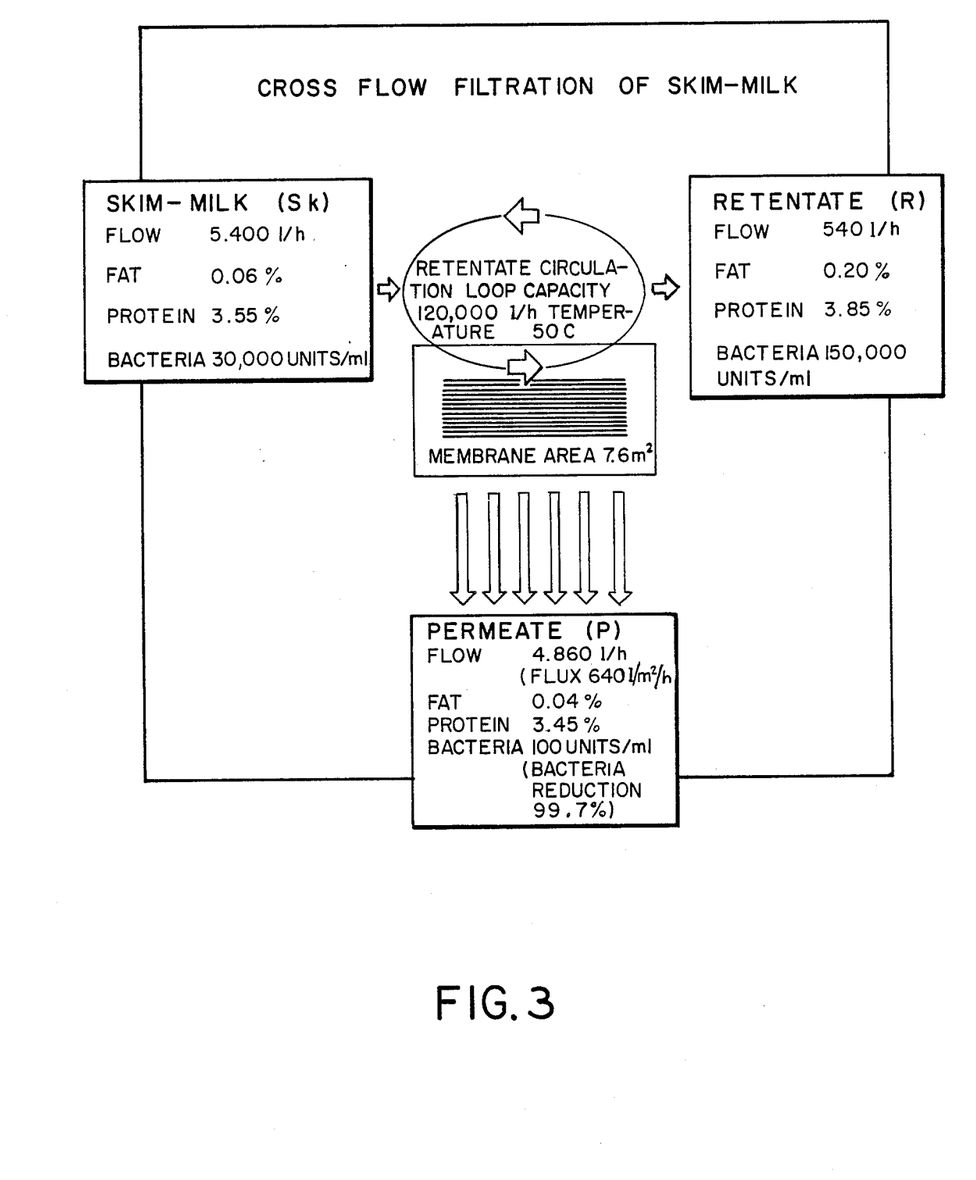
FIG. 3 is a schematic flow chart of the flow volumes and related data in a commercial embodiment of the method of the invention.

FIG. 3 illustrates a continuous commercial-scale milk processing operation carried out in accordance with the invention. A flow of 5,400 liters/hour (l/h) of skim milk (fat 0.06%, protein 3.55%, and bacteria 30,000/ml) was processed by passing it through a ceramic microporous membrane (average pore size about 1.482). The retentate was subjected to cross-flow over the membrane surface. Retentate was drawn out of the cross-flow circulation loop at a flow rate of 540 l/h (fat 0.20%, protein 3.85%, bacteria 150,000/ml). Permeate was recovered after passage through the membrane at a flow rate of 4,860 l/h (fat 0.04%, protein 3.45%, bacteria 100/ml). The bacteria concentration in the permeate was reduced by 99.7% compared with that of the skim milk inflow.

Those skilled in the art will further recognize that the above teachings may be varied as necessary in particular applications, and all such variations are included in the scope of this invention, which is defined in the following claims.

We claim:

1. A method for treating raw milk to produce treated milk having a lower bacterial content than the raw milk, in which raw milk is first divided by centrifugal separation into a fraction consisting of cream and a fraction consisting of skim milk, comprising the further steps of: (a) subjecting the skim milk fraction to microfiltration by passing the skim milk fraction through a microfilter having a retaining membrane surface, the pores in said microfilter having an average diameter of at least about $0.8\mu$ and less than about $2.0\mu$, to yield a permeate which consists of skim milk with a lower fat globular, protein and bacterial content than the skim milk fraction, in which the microfiltration is carried out by directing the skim milk through a circulation path comprising the microfilter, at which the skim milk is directed to flow in a cross-flow filtration path, which is generally parallel with the retaining membrane surface during the microfiltration, (b) separating from the retaining membrane surface a retentate which consists of skim milk with a higher fat globular, protein and bacterial content than the skim milk fraction, (c) sterilizing the retentate, and (d) separately recovering the retentate, permeate and cream fractions.

2. The method according to claim 1, including step (e) remixing two or more recovered fractions selected from the group consisting of retentate, permeate and cream, in desired proportions.

3. The method according to claim 2, in which at least a part of the retentate is remixed with the permeate.

4. The method according to claim 1, in which the retentate is mixed with a part of the cream fraction, yielding a mixture which is then sterilized and thereafter mixed with the permeate.

5. The method according to claim 1, in which the average microfilter pore diameter is about $1.4\mu$.

6. The method according to claim 1, in which the skim milk is directed, prior to the microfiltration, through a heat exchanger to adjust the skim milk temperature to be suitable upon entry of the microfilter.

7. The method according to claim 6, in which the microfiltration is carried out at a skim milk temperature within the range of about 40° C. to about 60° C.

8. The method according to claim 7, in which the microfiltration is carried out by a succession of intermittent operation periods, and in which the skim milk is kept at a temperature of about 40° C. at the start of each operation period, after which the temperature is allowed to gradually rise to about 60° C.

9. The method according to claim I, in which a ceramic microfilter is employed.

* * * * *

UNITED STATES PATENT AND TRADEMARK OFFICE
CERTIFICATE OF CORRECTION

PATENT NO. : 4,876,100

DATED : October 24, 1989

INVENTOR(S) : Sune Holm et al.

It is certified that error appears in the above-identified patent and that said Letters Patent is hereby corrected as shown below:

col. 2, line 53, "t" should be --to--.

col. 3, line 39, "a" should be --as--.

col. 5, line 56, "or" should be --of--.

Col. 10, Table 3, "Taste & Smell", line 5, should have a --3-- for 13th day of storage.

Signed and Sealed this

Twenty-fifth Day of December, 1990

Attest:

HARRY F. MANBECK, JR.

*Attesting Officer*      *Commissioner of Patents and Trademarks*